UNITED STATES PATENT OFFICE.

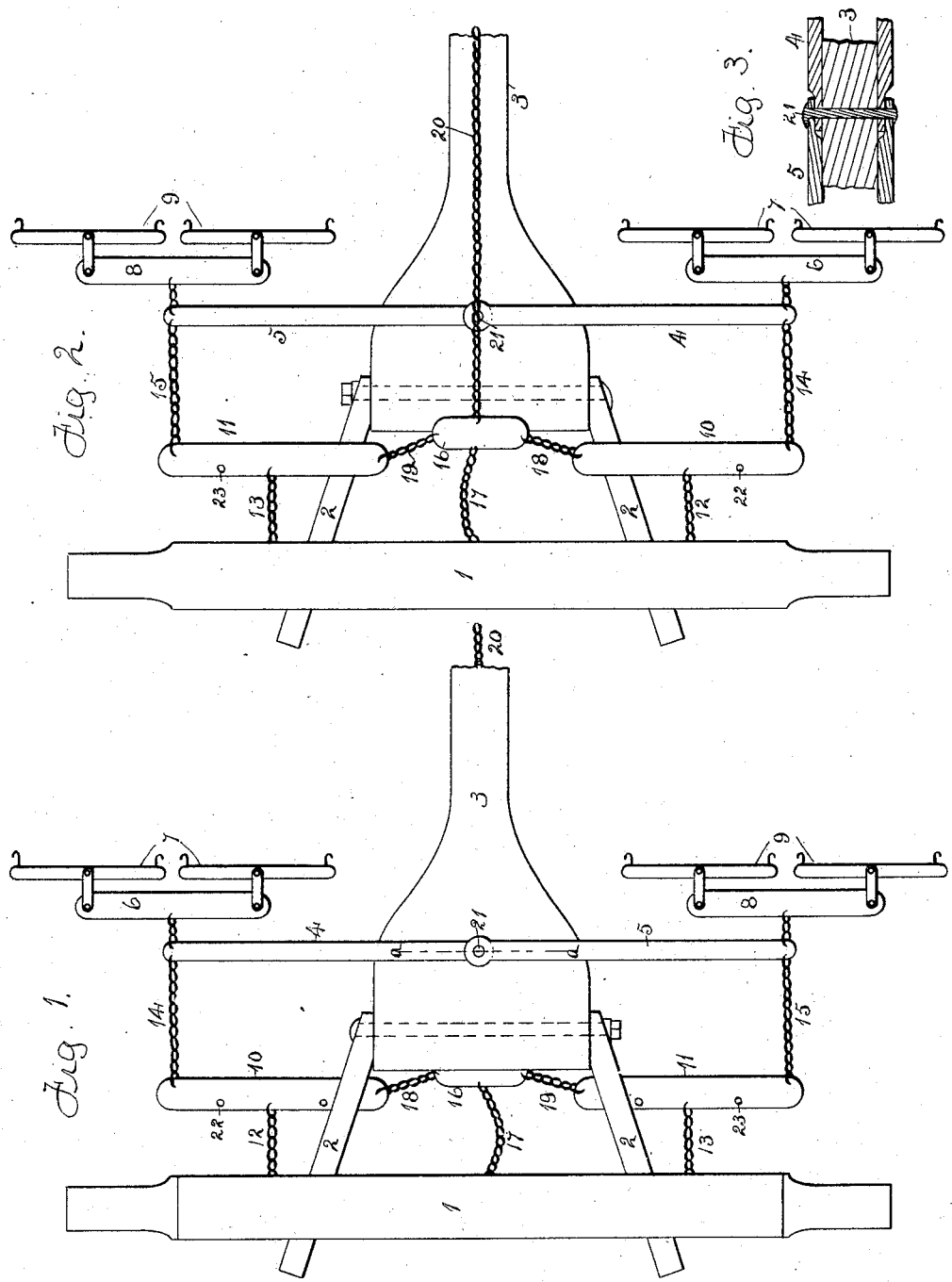

RUFUS P. HARRIMAN, OF CENTRAL POINT, OREGON.

DRAFT-EQUALIZER.

No. 906,014.   Specification of Letters Patent.   Patented Dec. 8, 1908.

Application filed September 24, 1908. Serial No. 454,662.

*To all whom it may concern:*

Be it known that I, RUFUS P. HARRIMAN, a citizen of the United States, residing at Central Point, in the county of Jackson and State of Oregon, have invented certain new and useful Improvements in Draft-Equalizers, of which the following is a specification.

The object of this invention is to construct an equalizer where for instance six or eight horses are used.

In the accompanying drawings. Figure 1 is a plan view of the forward section of a running gear with my improved equalizer in connection therewith. Fig. 2 is an underface view of the parts shown at Fig. 1. Fig. 3 is a vertical section on dotted line *a a* Fig. 1.

The forward portion of the running gear may be of any suitable construction, and in this instance comprises the axle 1, hounds 2 and tongue 3 connected to the hounds. To the tongue 3, forward of its pivotal connection with the hounds are pivotally connected two bars 4 and 5 which extend laterally of the tongue. To the free end of the bar 4 is connected the double tree 6 and to the doubletree are connected swingletrees 7 for two horses. To the free end of the bar 5 is connected the doubletree 8, and to the doubletree are connected swingletrees 9 for two horses. To the axle 1 are connected two eveners 10 and 11 by the chains 12 and 13 respectively. The outer end of the evener 10 is connected to the free end of the bar 4 by the chain 14, and the outer end of the evener 11 is connected to the free end of the bar 5, by the chain 15.

An intermediate bar 16 has a connection with the axle 1 by the chain 17, one end of this bar is connected to the evener 10 by the chain 18, and the other end of this bar 16 is connected to the evener 11 by the chain 19. A chain 20 has a connection with the center of the intermediate bar 16 and extends forward beyond the end of the tongue to which are connected four horses. As four horses are connected to the chain 20, and four horses are connected to the swingletrees 7 and 9, all eight horses will exert the same pull on the chains 12 and 13 in their connection with the axle 1. The chain 17 prevents the horses attached to the chain 20 from getting too far ahead. By adjusting the chains 12 and 13 in the holes 22 and 23 of the eveners 10 and 11 respectively, two horses may be connected to the chain 20, and each of the six horses will exert the same force on the tongue.

This equalizer is especially adapted for harvesting machines where four or eight horses are employed.

I claim as my invention.

A draft equalizer comprising a tongue, two bars pivotally connected with the tongue and extending laterally thereof, a doubletree connected to the end of each bar, two eveners connected to the axle or other part of an implement, connections between the eveners and the bars, an intermediate bar, connections between the eveners and the intermediate bar, and a connection with the intermediate bar leading in the direction of the tongue.

In testimony whereof I have hereunto set my hand in presence of two subscribing witnesses.

RUFUS P. HARRIMAN.

Witnesses:
 L. N. SWIFT,
 J. H. MOWRY.